United States Patent
Haugen et al.

(10) Patent No.: US 8,983,948 B1
(45) Date of Patent: Mar. 17, 2015

(54) PROVIDING ELECTRONIC CONTENT BASED ON A COMPOSITION OF A SOCIAL NETWORK

(71) Applicant: Google Inc., Mountain View, CA (US)

(72) Inventors: Frances B. Haugen, Mountain View, CA (US); Benjamin A. Staffin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/726,756

(22) Filed: Dec. 26, 2012

Related U.S. Application Data

(60) Provisional application No. 61/581,563, filed on Dec. 29, 2011.

(51) Int. Cl.
*G06F 17/00* (2006.01)
*G06F 17/30* (2006.01)

(52) U.S. Cl.
CPC .................................. *G06F 17/3053* (2013.01)
USPC ........... 707/728; 707/722; 707/736; 707/758; 706/12; 706/14

(58) Field of Classification Search
None
See application file for complete search history.

(56) References Cited

U.S. PATENT DOCUMENTS

| | | | |
|---|---|---|---|
| 7,904,511 B2 * | 3/2011 | Ryan et al. | 709/204 |
| 8,463,795 B2 | 6/2013 | van Hoff | |
| 8,661,043 B1 * | 2/2014 | Hartman et al. | 707/748 |
| 8,818,917 B2 * | 8/2014 | Flinn et al. | 706/11 |
| 2007/0226248 A1 * | 9/2007 | Darr | 707/102 |
| 2007/0233671 A1 * | 10/2007 | Oztekin et al. | 707/5 |
| 2008/0065600 A1 * | 3/2008 | Batteram et al. | 707/3 |
| 2008/0122026 A1 * | 5/2008 | Chen et al. | 257/529 |
| 2010/0082604 A1 * | 4/2010 | Gutt et al. | 707/721 |
| 2010/0318619 A1 | 12/2010 | Meijer | |
| 2011/0004692 A1 | 1/2011 | Occhino et al. | |
| 2011/0087661 A1 * | 4/2011 | Quick et al. | 707/732 |
| 2011/0320441 A1 * | 12/2011 | Lee et al. | 707/723 |
| 2012/0096000 A1 * | 4/2012 | Azar et al. | 707/732 |
| 2013/0073971 A1 | 3/2013 | Huang et al. | |
| 2013/0305278 A1 * | 11/2013 | Gordon et al. | 725/32 |
| 2014/0052739 A1 * | 2/2014 | Hartman et al. | 707/748 |
| 2014/0108143 A1 | 4/2014 | Davitz et al. | |

* cited by examiner

*Primary Examiner* — Hung Le
(74) *Attorney, Agent, or Firm* — Fish & Richardson P.C.

(57) ABSTRACT

Techniques for providing electronic content may include: identifying members of a social network that have a characteristic in common; determining a first proportion of the social network that the members compose; determining that a first member of the social network has the characteristic; identifying first content from the members that have the characteristic in common; and outputting second content from the social network to the first member. At least some of the first content may be included in the second content, and the at least some of the first content may represent a second proportion of the second content, where the second proportion is based on the first proportion.

19 Claims, 6 Drawing Sheets

FIG. 6

PROVIDING ELECTRONIC CONTENT BASED ON A COMPOSITION OF A SOCIAL NETWORK

CROSS-REFERENCE TO RELATED APPLICATION

Priority is hereby claimed to U.S. Provisional Application No. 61/581,563, which was filed on Dec. 29, 2011. The contents of U.S. Provisional Application No. 61/581,563 are hereby incorporated by reference into this disclosure.

BACKGROUND

This disclosure generally relates to providing electronic content based on a composition of a social network Internet-based social networks provide a digital medium for users to interact with one another and to share information. For examples, users are able to distribute electronic content (e.g., textual comments, digital images, digital videos, digital audio, hyperlinks to Web sites, etc.) to other users that they might be connected with in the social network. Electronic content that is distributed to a user can be displayed to the user in a content stream in a home (or "stream") page.

Certain users may be more reluctant to share content, or otherwise interact with others, on a social network. Similarly, users may be reluctant to share information, or interact with others, about a particular subject. Consequently, some users may be disproportionately less-represented on the social network.

SUMMARY

Example techniques for providing electronic content may include: identifying members of a social network that have a characteristic in common; determining a first proportion of the social network that the members compose; determining that a first member of the social network has the characteristic; identifying first content from the members that have the characteristic in common; and outputting second content from the social network to the first member. At least some of the first content may be included in the second content, and the at least some of the first content may represent a second proportion of the second content, where the second proportion is based on the first proportion. The following features, taken alone or in combination, may be part of the above techniques.

The characteristic may be a demographic characteristic. The demographic characteristic may be exhibited by less than, or more than, half of the members of the social network. The first proportion and the second proportion may be substantially equal. The second proportion may be within a range of the first proportion. The second proportion may be a multiple of the first proportion. The first proportion may correspond to a minimum for the second proportion. The first proportion may correspond to a maximum for the second proportion.

The techniques may include outputting the second content as part of a content stream in which at least some of the first content is presented at earlier positions in the content stream relative to content in the second content.

The members of the social network may be identified by examining profiles of the members of the social network. Determining that the first member of the social network has the characteristic may include examining a profile of the first member to determine that the first member has the characteristic.

Determining that the first member of the social network has the characteristic may be based on online activity of the first member.

The techniques may include receiving a search query from the first member. Identifying the first content may include generating a relevance score for the first content that is based on the first member having the characteristic, and selecting the first content based on the relevance score.

The techniques may include receiving a search query from the first member. The first content may include content that both relates to the search request and that is from the members that have the characteristic in common. The second content may include search results that are responsive to the search query. Ranking scores may be generated for the search results, and the ranking scores of the first content may be adjusted to affect ranking of the first content relative to other second content.

Example techniques for providing electronic content may include: determining an amount of members in a social network having a particular characteristic; determining that a first member of the social network has the particular characteristic; identifying first content from other members of the social network that have the particular characteristic; adjusting a score for the first content based on the amount of members in the social network with the particular characteristic; and outputting at least some of the first content to the first member based on the adjusted score. The following features, taken alone or in combination, may be part of the above techniques.

The score for the first content may include a ranking score and adjusting the score may produce an adjusted ranking score. Based on the adjusted ranking score, the at least some of the first content may be output in a content stream and in a position in the content stream that is ranked above other content in the content stream that is not the first content.

The score for the first content may include a relevance score and adjusting the score may produce an adjusted relevance score. The at least some of the first content may be selected for output in a content stream based on the adjusted relevance score.

The score may be a first score that is a relevance score. Adjusting the first score may produce an adjusted relevance score. The at least some of the first content may be selected for output in a content stream based on the adjusted relevance score. The techniques may also include adjusting a second score for the first content based on the amount of members in the social network with the particular characteristic; and outputting the at least some of the first content to the first member based also on the adjusted second score. The second score may be a ranking score and adjusting the second score may produce an adjusted ranking score. Based on the adjusted ranking score, the at least some of the first content may be output in the content stream in a position that is ranked above other content in the content stream that is not the first content.

The score may be based on one or more social affinity scores between the member and one or more other members of the social network. The characteristic may include, but are not limited to, at least one of: demographics, network activity, or interests.

Advantages of the foregoing techniques may include, but are not limited to, allowing the content stream of a social network to reflect, at least for some users, the composition of the social network. For example, if the social network is composed of 50% of a demographic, then half of the content presented in a user's content stream may be from that demographic. In some examples, this feature may be for use with certain users, e.g., if the social network is composed of 50% of the demographic, then half of the content presented in the content stream of a person in that demographic may be from others in that demographic, but that need not be the case for users not within that demographic. Allowing users to see content from others like them may promote further interaction on the social network.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 6 shows an example of a Web page containing a content stream that is affected by the processes described herein.

Like reference symbols in the various drawings indicate like elements.

DETAILED DESCRIPTION

Figure 1:
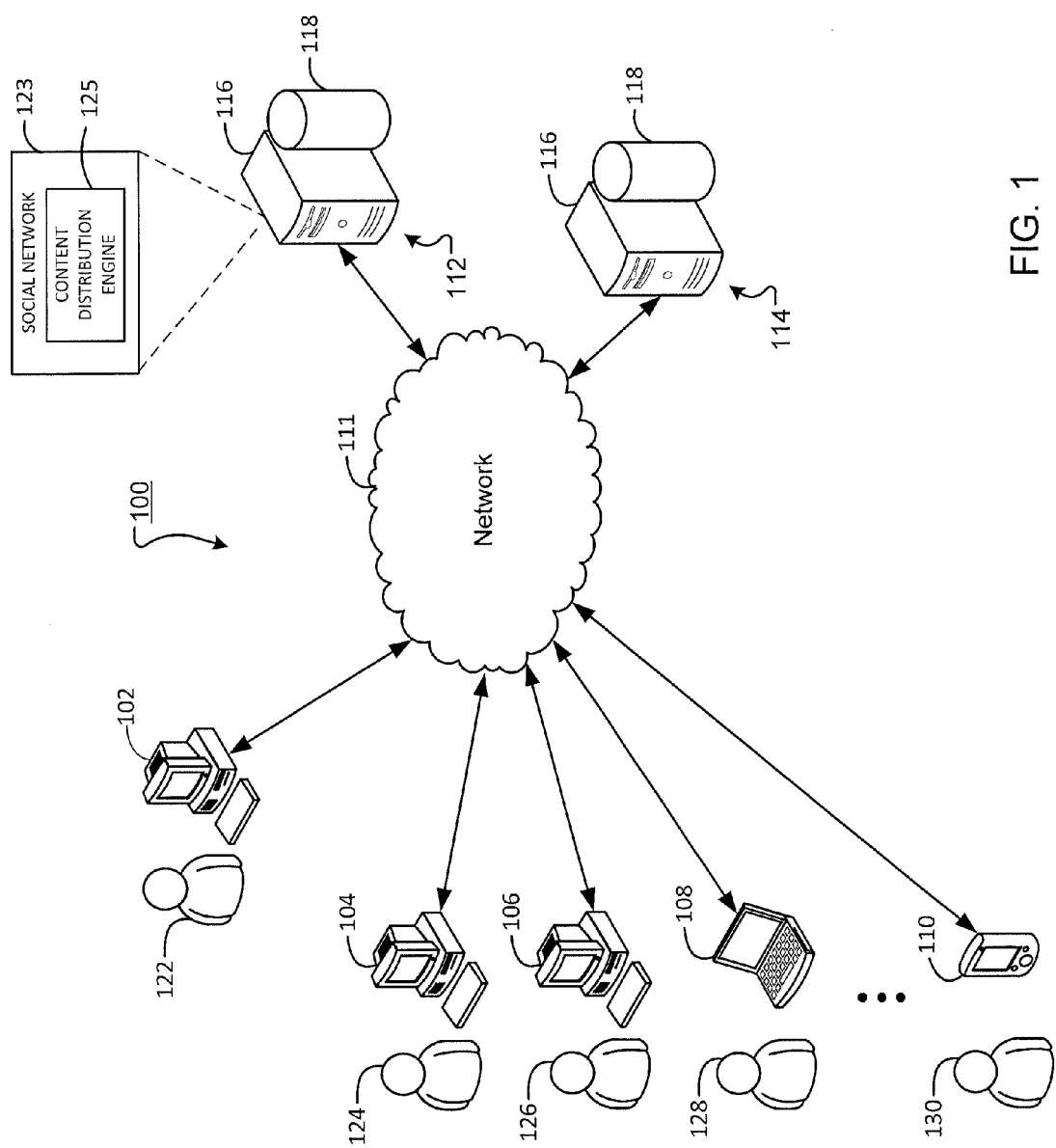
FIG. 1 is a block diagram showing an example of a network environment on which the process described herein may be implemented.

Described herein are techniques for providing content based on the composition of a social network. In some implementations, content from a group of users may be provided based on their representation within the social network. For example, if the social network includes 25% members of a demographic, then a quarter of the content provided to a user may be from that demographic, even if the total amount of content on the social network that is from that demographic is less than (or more than) 25%. As a result, content from a particular group may be proportionally represented in users' content streams. In some implementations, proportional content promotion may be specific to members of a particular group. In the above example, if the user is a member of a demographic, then a quarter of the content provided to the user may be from that demographic. On the other hand, in this example, if the user is a not a member of the demographic, then the amount of content provided from the demographic need not correspond to the proportion of the demographic on the social network.

The techniques described herein may apply to demographics (e.g., location, education, etc.) or to other characteristics. In this regard, in some implementations, content may be provided based on user interests. For example, users who are interested in a genre of music (e.g., country music) may be a minority population on a social network. Accordingly, the techniques described herein may be used to provide content from users interested in that genre of music in proportion to their representation on the social network. This may be true for the entire population of the social network or it may be specific to members of the social network who share the same interest.

In some implementations, the amount of content that is provided may be in direct proportion to the representation of a group of users on a social network. For example, if the social network contains 33% athletes, then 33% of the content provided to users may be from athletes. In other implementations, the amount of content provided may be based on, but not the same as, the representation of a group of users on a social network. For example, if the social network contains 33% athletes, then the techniques described herein may use that 33% as a floor or a ceiling for providing content. In the case of a floor, for example, the amount of content from athletes may be at least, and possibly more than, 33%. In the case of a ceiling, for example, the amount of content from athletes may be as much as, or less than, 33%. In other implementations, a factor may be applied to the proportion and the resulting amount of content may be affected by that factor. For example, the factor may be two in the above example, in which case the amount of content promoted may be 66%. In other implementations, the amount of content may be within a tolerance of the proportion, e.g., ±1%, ±2%, ±3% . . . ±10%, ±15%, ±20%, or increments thereof.

In some implementations, the representation of a group of users on a social network may affect rankings applied to search results. For example, searches of content on the social network may be conducted. Relevance and/or ranking scores associated with content on the social network may be affected by the representation of a group of users on a social network. For example, relevance scores of content may be adjusted so that content from a less-represented group on the social network (e.g., a group with 50% or less representation) is deemed more relevant to the search query than similar (or identical) content from groups that are not less-represented. Likewise, ranking scores of content from less-represented groups may be adjusted so that relevant is ranked so that such content will be presented before similar (or identical) content from groups that are not less-represented. In an example, if a user is in a demographic, and it is known that there are 25% of the demographic on the social network, relevance scores of content from users in the demographic may be adjusted so that such content is deemed more relevant than if that content had not been from users not within the demographic. In this example, ranking scores for identified content may be adjusted so that relevant content from users in the demographic will be presented in a more prominent position in the search results than had that content not been from users in the demographic. Similar processes may be performed to reduce the amount and prominence of content from other, e.g., heavily-represented, group(s).

FIG. 1 is a block diagram showing an example of a network environment on which the techniques described herein may be implemented. FIG. 1 shows example network environment 100. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each includes a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by the server system 112, by uploading and downloading electronic content to the social network. The electronic content may include, e.g., text comments (e.g., updates, announcements, replies), digital images, videos, audio files, and/or other appropriate information. In some implementations, information can be posted on a user's behalf by systems and/or services external to social network 123 or the server system 112. For example, the user may post a review of a movie to a movie review Web site, and with proper permissions, that Web site may cross-post that review to social network 123 on the user's behalf. In another example, a software application executing on a mobile device, with proper permissions, may use global positioning system (GPS) capabilities to determine the user's location and automatically update social network 123 with the user's location (e.g., "At Home", "At Work", "In Boston, Mass."). Generally, users interacting with the computing devices 102, 104, 106, 108, 110 can also use social network 123 to define social circles to organize and to categorize the user's relationships to other users of the social network.

Electronic content can be distributed to contacts within social network 123, including one or more social circles, so that such content is viewable by the indicated contacts and/or contacts, or others. In an example operation, a user of social network 123 can generate content and indicate, e.g., one or more individual social network contacts and/or social circles to which the generated content is to be distributed. During a content write-time, a content data set is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identify of the content author, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, creating an underlying content data set. The distribution can include a second user and a third user. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third use. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the content is directed, by its author, to be distributed to the particular user, the particular user is not provided in the ACL for the content. In some examples, if the social affinity score is at or above the threshold score, it is determined that the content will be accessible by, and/or distributed to, the particular user. Consequently, in this example, the content is directed, by its author, to be distributed to the particular user and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 118 of FIG. 1) and are transmitted to a client device associated with the requesting user. In some implementations, the ACL can be provided based on an overall score, a quality score and/or the social affinity score. Content may be distributed to a user's main page for inclusion in a content stream.

Figure 2:
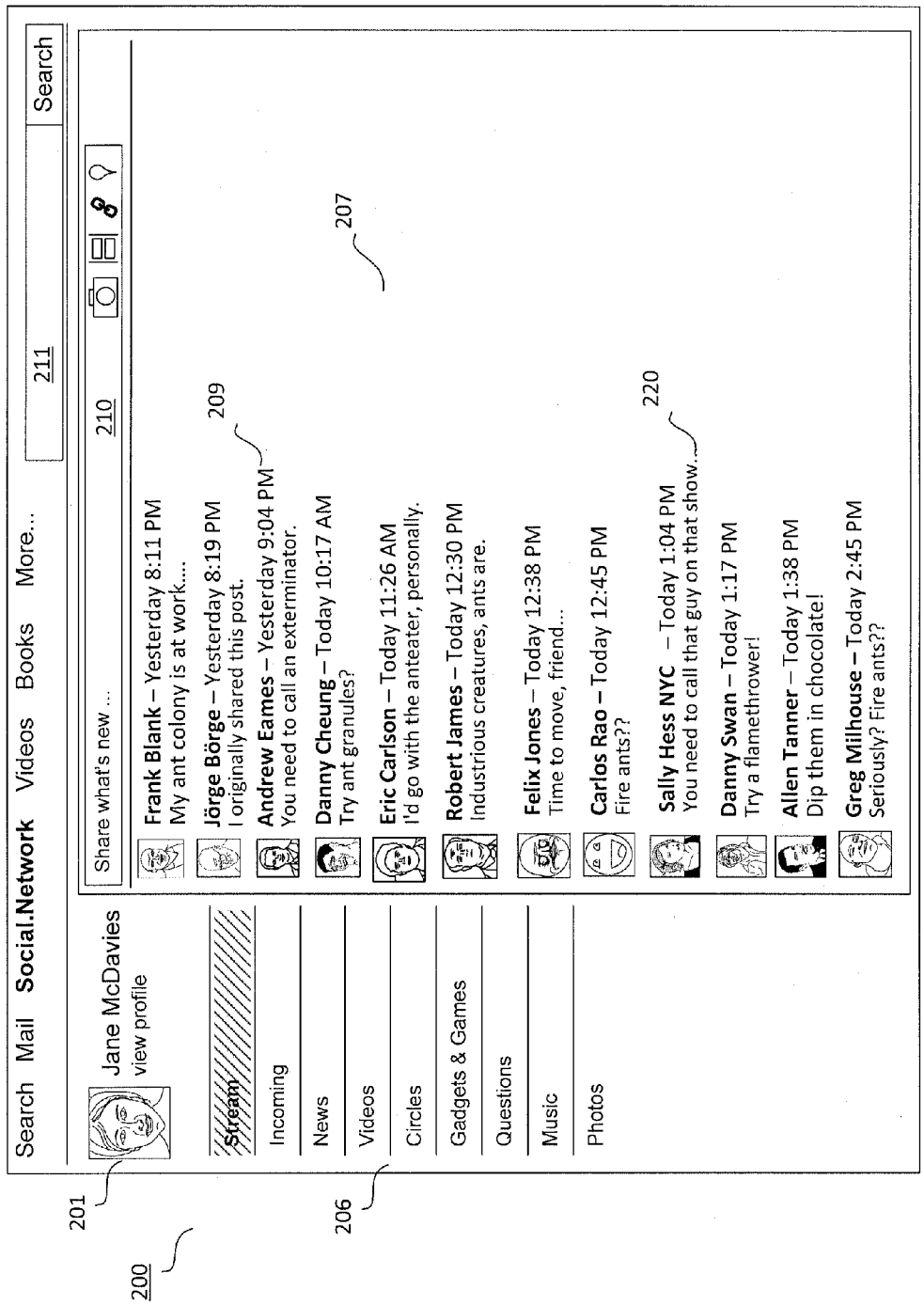
FIG. 2 shows an example of a main page for a user of a social network.

FIG. 2 shows an example main page 200 for a user of a social network. For example, page 200 can be provided as a Web page within a Web site of social network 123, and can display electronic content that has been shared with a user 201 associated with the page 200. In the illustrated example, the example user is "Jane McDavies" and page 200 displays, items (e.g., electronic content) that other users have shared with the user and/or items that the user has shared with other users. Page 201 includes a social network menu 206 and a content stream 207, in which items of content are presented. Example content items 209 that have been distributed to the user are displayed in the content stream. Generally, items 209 displayed in content stream 207 include electronic content that is distributed to the user from contacts established within the social network. A content sharing interface 210 can also be provided on page 200. The user can activate (e.g., click on) the content sharing interface 210 to share electronic content. Although twelve content items are depicted in FIG. 2, it is appreciated that page 200 can display more or less than twelve content items to the user. A search field 211 can also be provided on page 200 to search social network 123 for content.

The techniques described herein may be used to determine which content items to display to the user in the user's stream. In an example, the processes may skew distribution of the content based on the composition of the social network, e.g., so that the content items in a user's stream reflect the composition of the social network. In another example, the processes may skew distribution of the content based, in addition, on one or more characteristics of the user, e.g., based on the user's demographics or based on interests of the user (e.g., an interest in a musical or television genre). In some examples, skewing distribution of the content may include adjusting scoring data that is based on one or more social affinity scores so that content from users having a particular characteristic (e.g., a characteristic in common with the user) is displayed in the user's content stream and/or is displayed at particular positions in the user's content stream.

Figure 3:
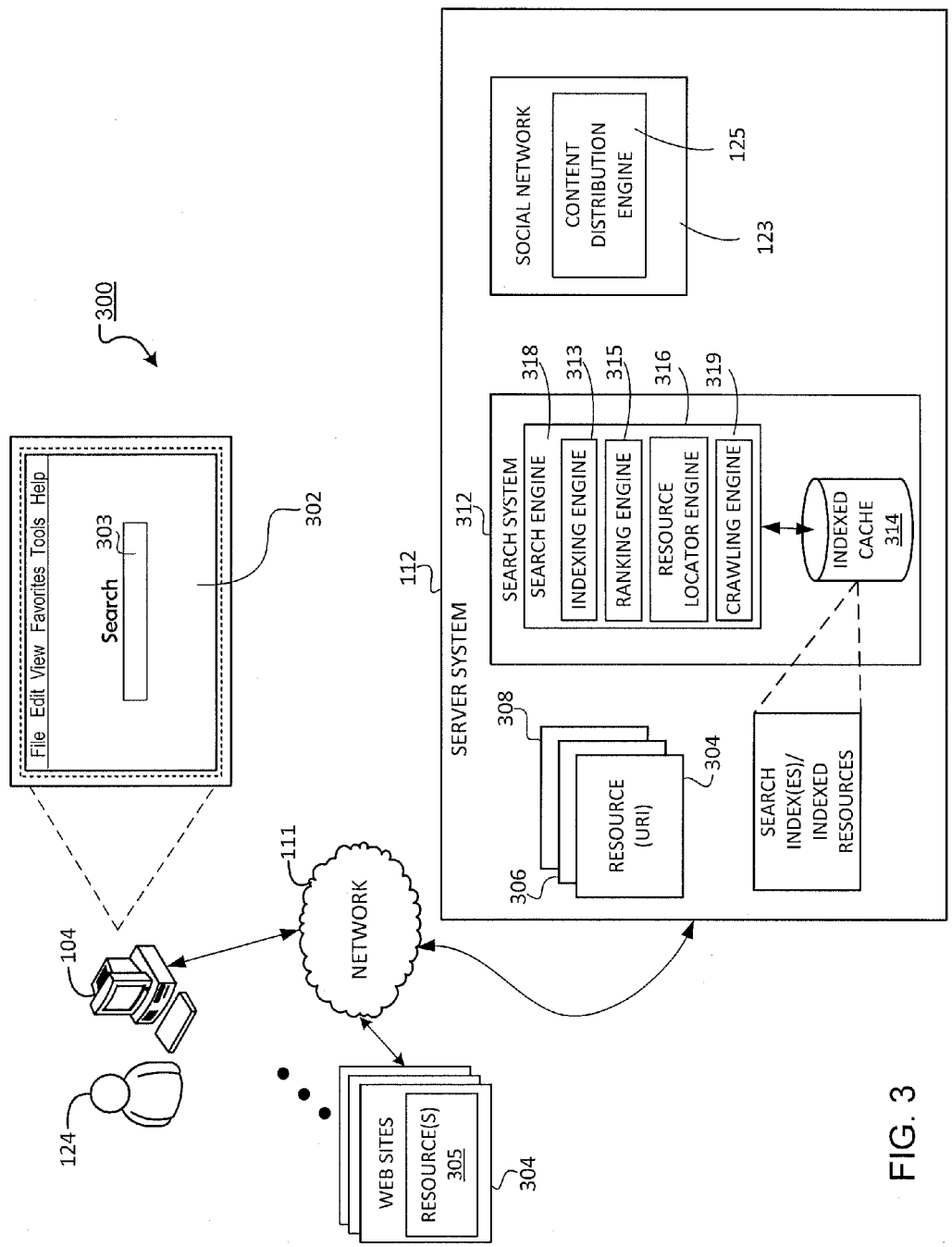
FIG. 3 is a block diagram of an example part of the network environment of FIG. 1.

FIG. 3 is a block diagram of an example part of the network environment of FIG. 1. Specifically, FIG. 3 shows portion 300 of example network environment 100. In this example implementation, server system 112 stores resources 304, 306, 308. A resource has an associated resource identifier (Resource ID). For example, resources 304, 306, 308 may correspond to different Web pages of the same Web site, or may correspond to Web pages of different Web sites. As explained below, in this example operation, computing device 104 communicates with server system 112 to display a home Web page ("home page") 302 of a search engine Web site and a home page of a social network (e.g., page 200 of FIG. 2 containing the user's content stream).

To view a Web page, user 124 may input or select a Resource ID using a Web browser that is executed on computing device 104. The Resource ID may include, for example, a URI or a uniform resource locator (URL). A request including the Resource ID is transmitted from computing device 104 to server system 112 over network 111. In response, the server system identifies the requested resource based on the Resource ID, and transmits the requested resource to computing device 104 over network 111. For example, the resource may be home page 200 of social network 123 or a home page 302 of search system 312. In some implementations, search system 312 is part of social network 123 or it is independent thereof yet able to access content from social network 123.

Page 302 for search system 312 may include a field 303 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 312 may be implemented, e.g., on server system 112 as shown or on other appropriate hardware. Search system 312 includes a search engine 318 and one or more search indexes. Search system 312 identifies resources 305 (e.g., Web pages, images, news articles, user-generated content, social information (e.g., from social network 123), or other public and/or private resources) provided by content publishers on Web sites 304. Appropriate permission(s) may be required to access non-public content.

Search system 312 includes a crawling engine 319 to crawl resources, and an indexing engine 313 to index those resources in one or more search indexes (referred to collectively as "search index") stored, e.g., in indexed cache 314. Search engine 318 also includes a resource locator engine 316 for identifying resources within the search index that are responsive to, and that may be relevant to, a query (for example, by implementing a query text matching routine). A ranking engine 315 ranks resources deemed relevant to the search query.

Social graph information may be included in a same search index as other resources or in a separate search index (not shown). As described in more detail below, the social graph information may include, e.g., comments, endorsements, connections, affinities, and so forth related to indexed content and to a user's social graph. The social graph information may include content from social network 123. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 319 may crawl user-generated content (of both the searcher and others, e.g., members of the searcher's social graph), and indexing engine 313 may incorporate that content into an appropriate search index. Resource locator engine 316 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In response to a search query, search engine 318 may access indexed cache 314 to identify resources 305 that are relevant to the search query. Resource locator engine 316 identifies resources 305 in the form of search results and returns the search results to a requesting device in search results pages. A search result may include data generated by search system 312 that identifies a resource 305, and that includes a link to the corresponding resource, along with images, video, or other appropriate content. An example search result may include a Web page title, a snippet of text or a portion of an image extracted from the Web page, and the URL of the Web page. In some cases, the search results may also include social information. For example, included with some of the search results may be comments, endorsements, or other information obtained about the search results from a user's social graph. The social information may also be used to affect retrieval, ranking, and display of the search results, as described below. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Figure 4:
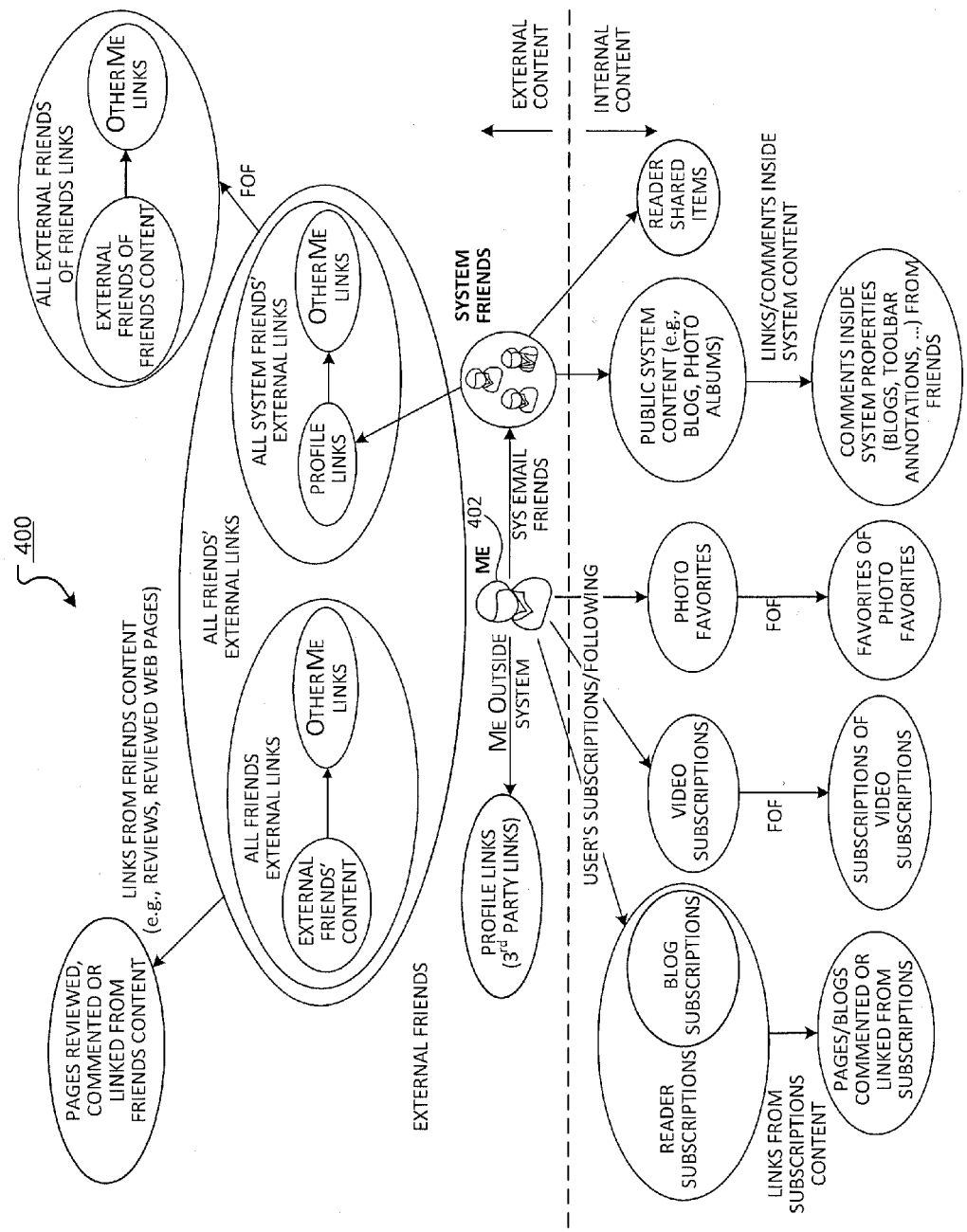
FIG. 4 a conceptual view of an example of a social graph.

FIG. 4 is a conceptual view of an example social graph 400. Among other things, FIG. 4 shows sources of information for a social graph. In this example, the user's social graph is a collection of connections (e.g., users, resources/content, etc.) identified as having a relationship to the user 402 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 4 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 314 of FIG. 3. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an option or by keeping contacts out of particular groups used to generate the social graph. In some implementations, privacy features provide a user with an option to allow or to prevent, respectively, being included (or removed the user if already included) as a member of another's social graph. Thus, users may have control over what personal information or connection information, if existing, is included in their social graphs and, consequently, that is included in the content streams and search results described herein.

Figure 5:
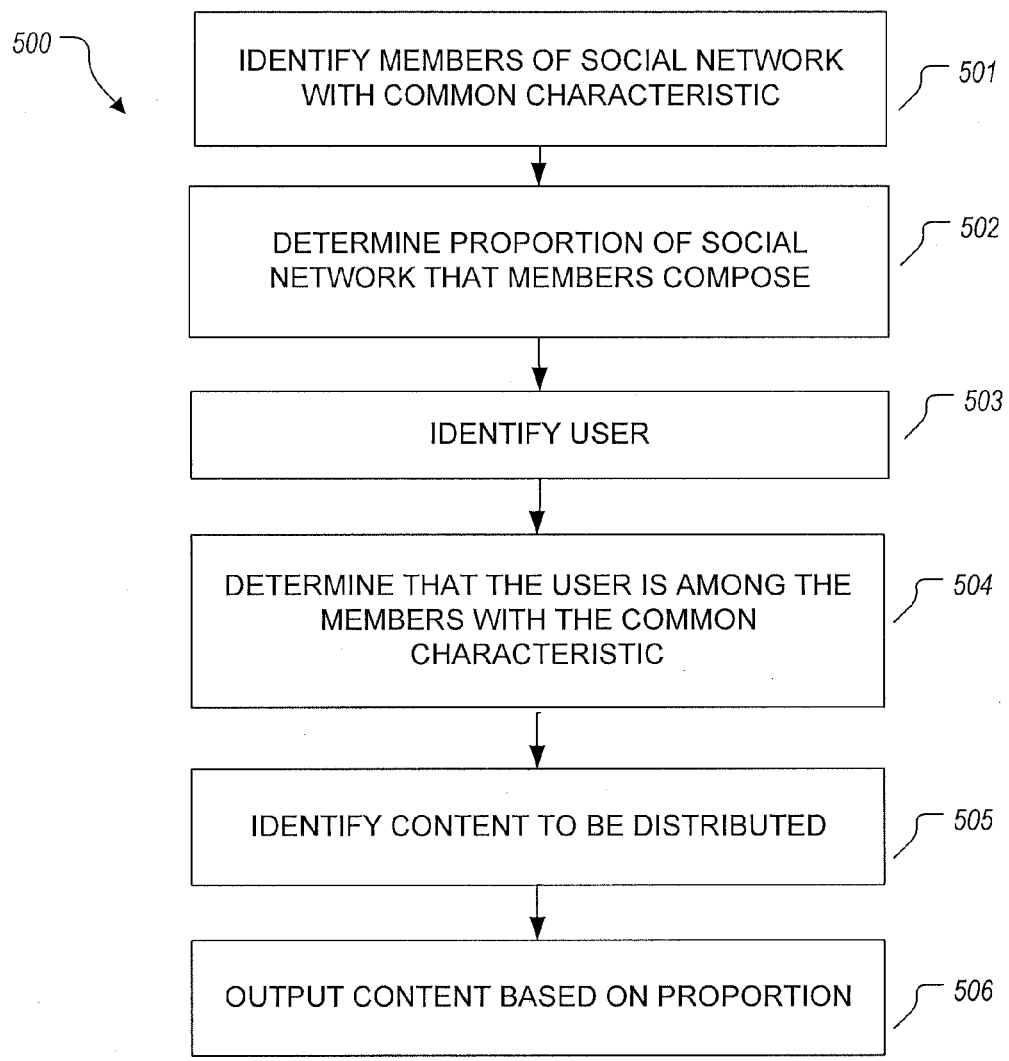
FIG. 5 is a flowchart showing an example of a process for providing content based on the composition of a social network.

FIG. 5 is a flowchart showing an example of a process 500 for providing content based on the composition of a social network. Process 500 may be performed, e.g., by content distribution engine 125, alone or in combination with search engine 318, to incorporate content into a user's content stream.

Process 500 includes identifying (501) of members of a social network that have a characteristic in common. The characteristic may include, e.g., a demographic characteristic (e.g., location, education, etc.), an interest (e.g., an interest in a general or specific topic, e.g., a hobby, an academic pursuit, or the like), or another appropriate characteristic that a group of members of social network 123 have in common. In some implementations, process 500 may identify the characteristic by searching an index of user profiles, which may be stored as part of a search index in indexed cache 314. The searching may be performed (with appropriate permission) to identify keywords in the user's profile and synonyms thereof. The searching may also be performed to identify other content that is indicative of the characteristic. Examples of such other content include, but are not limited to, images, audio, video, metadata thereof, and so forth. The searching may be performed by search system 312, e.g., by resource locator engine 316. In other implementations, process 500 may infer that users have a common characteristic by searching an index of social graph information containing, e.g., search logs, information indicative of interaction with content, Web sites, groups, circles, etc., and other appropriate information from the corpus of social network 123. As was the case above, searching may be performed by search system 312, e.g., by resource locator engine 316.

Process 500 determines (502) a proportion of the social network that the identified (501) members compose. For example, process 500 may identify a number of members of social network 123 by searching a database containing statistics about the social network. The database may be accessible, e.g., through one or more servers that host the social network. Knowing the number of members of social network 123, and the number of members of social network 123 who have the characteristic in common, process 500 is able to determine the proportion (e.g., the percentage) of social network members who have the characteristic.

Process 500 identifies (503) a current user of the social network. Process 500 may identify the current user based, e.g., on login information (e.g., a user ID and password), an IP address, a MAC address, or other appropriate identification information. Process 500 determines (504) that the identified user is among the members of social network 123 who have the common characteristic. For example, process 500 may perform searches of one or more search indices, as described above, to determine that the user has the common characteristic.

Process 500 identifies (505) content to be distributed to the user from members of the social network who have the characteristic in common with the user. The content may be identified from among content to be distributed to the user, e.g., from contacts within social network 123, including one or more social circles, as described above. In some implementations, process 500 identifies the members and corresponding content using content data, distribution data, and identification data associated with content, which was described above. In other implementations, the content to be distributed includes search results that are responsive to one or more queries provided by the user or others on the social network.

Process 500 outputs (506) the identified content, e.g., for inclusion in a content stream of the user. The content may be presented among other content, including content provided from others in the social network who do not have the characteristic in common with the user. For example, if the user is a stamp collector, content from stamp collectors (e.g., the identified content) may be provided among content from other users (e.g., coin collectors) who do not share the common characteristic (e.g., stamp collecting) with the user. In this example implementation, the content that the user is provided for presentation is influenced by the composition of social network 123. For example, the content that is provided may be influenced by the proportion of users of the social network who have the characteristic in common with the user. For example, the user may be provided content from others on the social network who share the common characteristic with the user in proportion to their representation on the social network. For example, if the user is a New Yorker, and it is known that the social network is 35% New Yorkers, then 35% of the content that is provided to the user may be from other New Yorkers. Likewise, if the user is a sailing enthusiast, and it is known that 15% of the members of the social network are sailing enthusiasts, then 15% of the content that is provided to the user may be from sailing enthusiasts.

The proportion of content provided to the user may not directly correspond to a proportionate group representation on the social network. For example, as noted above, the proportion of a particular group may represent an upper bound or a lower bound of content to be provided by a user. In the example provided above, if the social network contains 33% athletes, then the processes described herein may use that 33% as an upper bound (ceiling) or a lower bound (floor) for promoting content. In the case of a floor, the amount of content from athletes may be at least, and possibly more than, 33%. In the case of a ceiling, the amount of content from athletes may be as much as, or less than, 33%. In other implementations, a factor may be applied to the proportion and the resulting composition of content may be affected by that factor. For example, the factor may be two in the above example, in which case the amount of content provided may be 66%. In other implementations, the amount of content may be within a tolerance of the proportion, e.g., ±1%, ±2%, ±3% . . . ±10%, ±15%, ±20%, or increments thereof.

As also explained above, in some implementations, the representation of a group of users on the social network may affect rankings applied to search results or other content in a content stream. For example, searches of content on the social network may be conducted, e.g., by search engine 318. Relevance and/or ranking scores associated with content on the social network may be affected by the proportionate representation of a group of users on a social network. For example, relevance scores of content may be adjusted so that content from a particular group (e.g., a less-represented group) on the social network is deemed more relevant to the search query than similar (or identical) content from other users of the social network. Conversely, relevance scores of content may be adjusted so that content from a particular group (e.g., a heavily-represented group) on the social network is deemed less relevant to the search query than similar (or identical) content from other users of the social network.

Similarly, ranking scores of content from particular groups (e.g., less-represented or heavily-represented groups) may be adjusted so that content is ranked so that the content is presented before or after similar (or identical) content from other social network users. In an example provided above, if a user is in a demographic, and it is known that there are 25% of that demographic on the social network, relevance scores of content from users in that demographic may be adjusted so that such content is deemed more relevant than if that content had not been from users in that demographic. In this same example, ranking scores for content (whether or not obtained through search) may be adjusted so that content from users in the demographic is presented in a more prominent position in search results or a content stream than had that content not been from users in that demographic. For example, in this case, the first N (N≥1) content slots in a stream may be reserved for users in that demographic.

The relevance and ranking scores of content may be adjusted for reasons other than group representation on a social network. For example, content may be provided proportionally based on interests of users. For example, if it is determined that the user is a sailing enthusiast as in the example provided above, the social network may provide an amount of content from other sailing enthusiasts that is based on the proportionate representation of sailing enthusiasts on the social network. If that proportion is below a threshold, the amount of content from sailing enthusiasts may be increased by a factor, e.g., 1.5, 2, 3, 5, 10, and so forth. So, for example, if the social network is 5% sailing enthusiasts, the processes described herein may multiply that 5% by 10 so that 50% of content provided to a user who may be a sailing enthusiast (e.g., in a content stream, search results, or other appropriate output format) is from sailing enthusiasts.

In other implementation, the processes described herein are not specific to directing proportionate content to particular users of the social network, e.g., to users of the social network who have characteristics in common with a particular group of users. For example, the processes described herein may be used to provide proportionate content to users of the social network regardless of whether those users have characteristics in common with other users. For example, if the processes determine that a social network is 10% persons over age 65, 15% persons between ages 45 and 65, and 25% persons between ages 25 and 45, then the processes may be configured to provide, to users of the social network, 10% of their content from persons over age 65, 15% of their content from persons age 45 to 65, and 25% of their content from persons age 25 to 45, regardless of whether the social network users fall within those age ranges.

Figure 6:
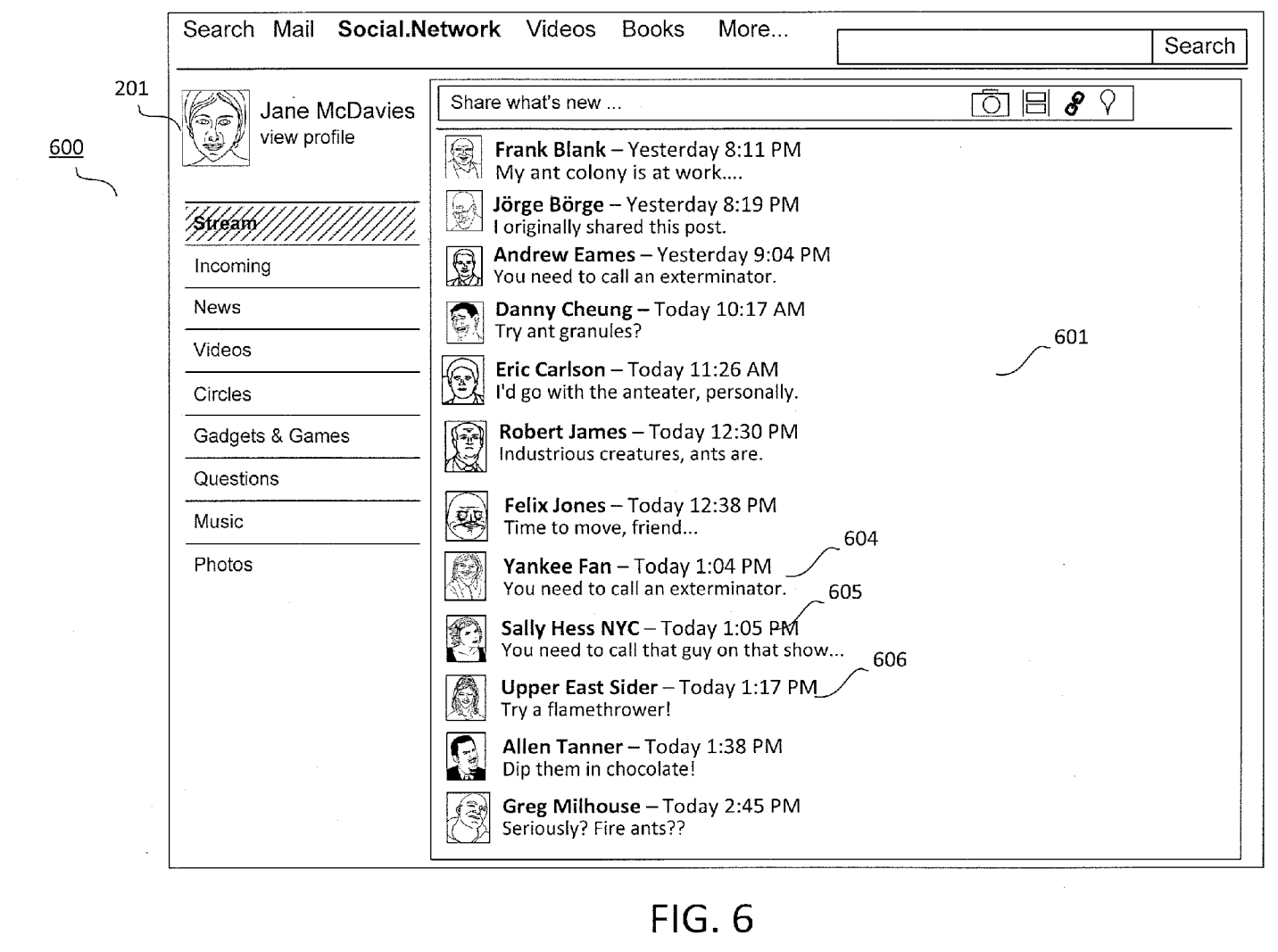

FIG. 2, which was described above, shows an example Web page containing a content stream that is unaffected by the processes described herein. FIG. 6 shows an example Web page 600 containing a content stream 601 that is affected by the processes described herein. In the example of FIG. 6, there are 25% New Yorkers on the social network and 75% others. Process 500 has been run to provide, to user 201, a proportion of content from New Yorkers that is commensurate with their representation on the social network. Accordingly, FIG. 6 shows a content stream 601, which is like content stream 207, but that has been modified to include about 25% content from New Yorkers. In this example, there are content items 604, 605 and 606 from New Yorkers to reflect their 25% make-up of the social network (as opposed to FIG. 2, in which one content item 220 was from a New Yorker). In some examples, exact percentages may not always be achievable. Accordingly, percentages that are achievable may be considered to be "about" a specific percentage. For example, if a window is configured to accommodate nine content items, then it may not be possible to achieve exactly 25% of the content items from a demographic (since 25% of 9 is 2.25). Accordingly, such examples, the number of content items may be rounded-up or down (in this example, to two or three content items) to achieve about the specific percentage.

As noted elsewhere herein, privacy features may provide a user with an option to allow or to prevent, respectively, their private or proprietary content from being included in content streams or search results.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (e.g., to a city, ZIP code, or state level), so that a particular location of a user cannot be determined. Thus, the user may have control over how information is collected about him or her and used by a content server.

Although implementations are discussed primarily in the context of electronic content generated and distributed in the form of electronic messages, implementations are applicable to other content types including, for example, chat content, social networking posts, content posted to sharing services (e.g., photo sharing services), content posted to a blogging services, and so forth.

Although implementations are discussed primarily in the context of presenting user-generated content from members of the searcher's social graph, user-generated content from parties who are not members of the searcher's social graph may also be presented. For example, if a user is searching for a particular topic, if available and appropriate permissions have been obtained, user-generated content from experts on that topic may be presented, even if those experts are not part of the searcher's social graph.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A method performed by one or more processing devices, comprising:
    identifying members of a social network that have a characteristic in common;
    determining a first proportion of the social network that the members compose;
    determining that a first member of the social network has the characteristic;
    identifying first content from the members that have the characteristic in common; and
    outputting second content from the social network to the first member, where at least some of the first content is included in the second content and the at least some of the first content represents a second proportion of the second content, the second proportion being based on the first proportion.

2. The method of claim 1, wherein the characteristic comprises a demographic characteristic; and
    wherein the first proportion and the second proportion are substantially equal.

3. The method of claim 1, wherein the characteristic comprises an interest in a topic; and
    wherein the first proportion and the second proportion are substantially equal.

4. The method of claim 1, further comprising:
    outputting the second content as part of a content stream in which at least some of the first content is presented at earlier positions in the content stream relative to content in the second content.

5. The method of claim 1, wherein identifying the members of the social network comprises examining profiles of members of the social network.

6. The method of claim 1, wherein determining that the first member of the social network has the characteristic is based on online activity of the first member.

7. The method of claim 1, further comprising receiving a search query from the first member;
    wherein identifying the first content comprises:
        generating a relevance score for the first content that is based on the first member having the characteristic; and
        selecting the first content based on the relevance score.

8. The method of claim 1, further comprising:
    receiving a search query from the first member;
    wherein the first content comprises content that both relates to the search request and that is from the members that have the characteristic in common.

9. The method of claim 8, wherein the second content comprises search results that are responsive to the search query; and
    wherein the method further comprises:
        generating ranking scores for the search results, wherein ranking scores of the first content are adjusted to affect ranking of the first content relative to other second content.

10. The method of claim 1, wherein the second proportion is within a range of the first proportion.

11. The method of claim 1, wherein the second proportion is a multiple of the first proportion.

12. The method of claim 1, wherein the first proportion corresponds to a minimum for the second proportion.

13. The method of claim 1, wherein the first proportion corresponds to a maximum for the second proportion.

14. One or more non-transitory machine-readable media storing instructions that are executable by one or more processing devices to perform operations comprising:
    identifying members of a social network that have a characteristic in common;
    determining a first proportion of the social network that the members compose;
    determining that a first member of the social network has the characteristic;
    identifying first content from the members that have the characteristic in common; and
    outputting second content from the social network to the first member, where at least some of the first content is included in the second content and the at least some of the first content represents a second proportion of the second content, the second proportion being based on the first proportion.

15. One or more non-transitory machine-readable media storing instructions that are executable by one or more processing devices to perform operations comprising:
    determining an amount of members in a social network having a particular characteristic;
    determining that a first member of the social network has the particular characteristic;
    identifying first content from other members of the social network that have the particular characteristic;
    adjusting a relevance score for the first content based on the amount of members in the social network with the particular characteristic, to obtain an adjusted relevance score; and
    outputting at least some of the first content to a content stream for the first member based on the adjusted relevance score;
    adjusting a ranking score for the first content based on the amount of members in the social network with the particular characteristic to obtain an adjusted ranking score; and
    outputting at least some of the first content to the first member based also on the adjusted ranking score such that at least some of the first content in the content stream is output in a position ranked above other content not included in the first content.

16. The one or more non-transitory machine-readable media of claim 15, wherein the score for the first content comprises a ranking score and adjusting the score produces an adjusted ranking score; and wherein, based on the adjusted ranking score, the at least some of the first content is output in a content stream and in a position in the content stream that is ranked above other content in the content stream that is not the first content.

17. The one or more non-transitory machine-readable media of claim 15, wherein the score for the first content comprises a relevance score and adjusting the score produces an adjusted relevance score; and wherein the at least some of the first content is selected for output in a content stream based on the adjusted relevance score.

18. The one or more non-transitory machine-readable media of claim 15, wherein the score is based on one or more social affinity scores between the member and one or more other members of the social network.

19. The one or more non-transitory machine-readable media of claim 15, wherein the characteristic comprises at least one of: demographics, network activity, or interests.

* * * * *

UNITED STATES PATENT AND TRADEMARK OFFICE
CERTIFICATE OF CORRECTION

PATENT NO.       : 8,983,948 B1
APPLICATION NO.  : 13/726756
DATED            : March 17, 2015
INVENTOR(S)      : Haugen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 68 days.

Signed and Sealed this
Twentieth Day of October, 2015

Michelle K. Lee
*Director of the United States Patent and Trademark Office*